(12) United States Patent
Vertogen et al.

(10) Patent No.: US 7,467,704 B2
(45) Date of Patent: Dec. 23, 2008

(54) CONVEYOR SYSTEM

(75) Inventors: Martinus Johannes Maria Vertogen, Zeeland (NL); Bram Antonius Carolus Van Rijt, Bergeijk (NL)

(73) Assignee: Vanderlande Industries Nederland B.V., Veghel (NL)

( * ) Notice: Subject to any disclaimer, the term of this patent is extended or adjusted under 35 U.S.C. 154(b) by 0 days.

(21) Appl. No.: 11/671,301

(22) Filed: Feb. 5, 2007

(65) Prior Publication Data

US 2007/0187211 A1    Aug. 16, 2007

(30) Foreign Application Priority Data

Feb. 7, 2006 (NL) .................................... 1031094

(51) Int. Cl.
*B65G 43/00* (2006.01)
(52) U.S. Cl. ................................. 198/460.1; 198/461.3
(58) Field of Classification Search .............. 198/459.1, 198/461.1, 461.2, 461.3
See application file for complete search history.

(56) References Cited

U.S. PATENT DOCUMENTS

| | | | | |
|---|---|---|---|---|
| 3,122,935 | A | | 3/1964 | Morling |
| 5,070,995 | A | * | 12/1991 | Schaffer et al. .......... 198/460.1 |
| 5,810,158 | A | * | 9/1998 | Schiesser et al. ......... 198/460.1 |
| 5,979,636 | A | * | 11/1999 | Vanacore et al. ......... 198/460.1 |
| 6,464,065 | B2 | * | 10/2002 | Herubel et al. ........... 198/460.1 |
| 6,811,018 | B2 | * | 11/2004 | Cotter et al. ............. 198/460.1 |
| 2004/0104100 | A1 | | 6/2004 | Schiesser et al. |

FOREIGN PATENT DOCUMENTS

| | | |
|---|---|---|
| EP | 0 602 694 A1 | 6/1994 |
| EP | 0 818 406 A1 | 1/1998 |
| EP | 1 584 580 A1 | 10/2005 |
| EP | 1 607 349 A1 | 12/2005 |

* cited by examiner

*Primary Examiner*—James R Bidwell
(74) *Attorney, Agent, or Firm*—Oblon, Spivak, McClelland, Maier & Neustadt, P.C.

(57) ABSTRACT

A conveyor system includes a plurality of end-to-end conveying modules, a main frame, a control unit, and a guide unit. The conveyor system influences spacing between successive products during transport thereof in a direction of transport between a charge end and a discharge end. Each of the conveying modules includes a frame, a plurality of parallel endless conveyor belts which pass over rotatable pulleys provided at a front side and a rear side of the conveying module, and a drive unit including a motor for driving each of the parallel endless conveyor belts of the conveying module. The conveying modules are connected to the main frame. The control unit controls the drive unit of each of the conveying modules individually. The guide units guides the conveying modules that are positioned between other of the conveying modules in a horizontal direction transverse to the direction of transport.

22 Claims, 16 Drawing Sheets

CONVEYOR SYSTEM

BACKGROUND OF THE INVENTION

I. Field of the Invention

The present invention relates to a conveyor system for influencing the spacing between successive products during transport thereof in a direction of transport between a charge end and a discharge end.

II. Description of Related Art

U.S. Pat. No. 5,070,995 discloses a conveyor system which makes it possible to influence the spacing between successive objects during transport thereof in a direction of transport between a charge end and a discharge end. Said conveyor system comprises five successive conveying modules each comprising two pulleys, one of which is driven by an individually controllable driving motor, over which two pulleys an endless conveyor belt is passed, which conveyor belt extends the full width of the conveying module. Randomly spaced objects being supplied upstream of the conveyor system by a supply conveyor can be spaced a desired (constant) distance apart upstream of the conveyor system by suitably controlling the various driving motors of the respective conveying modules. The conveying modules are relatively short in length, in the sense that, judging from the schematic FIG. 1 of the aforesaid U.S. patent, said length is in any case even shorter than the width of the conveyor belts. With such conveyor belts exhibiting a relatively small length-width ratio there is a risk that the conveyor belt will not run true on the pulleys and consequently tends to move off the pulleys in lateral direction. This risk occurs in particular upon acceleration or deceleration of the conveyor belts or when the conveyor belts are subjected to varying loads. It is precisely these conditions that occur with the conveyor system according to U.S. Pat. No. 5,070,995. Another important drawback of the conveyor system according to U.S. Pat. No. 5,070,995 is the fact that if a conveyor belt should fall out of action, which may occur in particular if the belt should break, the entire conveyor system cannot be used until said conveyor belt has been exchanged, which, depending on the construction of the conveying modules that is not described in detail in U.S. Pat. No. 5,070,995, may take up a considerable amount of time. With certain applications such a temporary failure of the conveyor belt, and consequently of the conveyor system as a whole, is unacceptable.

BRIEF SUMMARY OF THE INVENTION

The object of the present invention is in the first place to provide a conveyor system of the kind referred to in the introduction which provides a solution or at least an improvement as regards the problems as described above regarding the true running of the conveyor belts. In order to accomplish that object, the conveyor system according to the invention comprises a number of end-to-end conveying modules, a main frame, to which the conveying modules are connected, each conveying module comprising a frame and a number of parallel endless conveyor belts which are passed over pulleys provided at the front side and the rear side of the conveying module in question, which pulleys are rotatable with respect to the frame, as well as drive means comprising a motor for driving all the conveyor belts of the module, which conveyor system further comprises control means for individually controlling the drive means of each conveying module. A major advantage of using a number of side-by-side endless conveyor belts instead of one single, wide endless conveyor belt is that the length-width ratio of the conveyor belts is increased in such a manner that the behaviour of the individual conveyor belts as regards the true running thereof is significantly improved. A very important additional advantage is the fact that if one of the conveyor belts should break, the conveyor system as a whole can nevertheless continue to function, assuming that the objects to be processed have a width greater than the spacing between conveyor belts positioned adjacent to each other. Repairing or exchanging the conveyor belt in question can take place at a suitable later point in time, when the conveyor system is not required to function.

From a viewpoint of preventive or corrective maintenance it is preferable if the conveyor system according to the invention comprises guide means for guiding at least conveying modules that are positioned between other conveying modules in a horizontal direction transversely to the direction of transport. In this way a conveying module can readily be made available to one side for maintenance without there being a need to use the floor space that is present under the conveying modules, which is usually taken up by cable ducts, which makes it difficult or even impossible to use a hand truck or the like onto which a conveying module can be lowered after being detached from the main frame.

Although it is possible within the framework of the present invention that the guide means comprise guides which are rigidly connected to the main frame, it is preferable if the guide means comprise guides mounted to each conveying module for guiding an adjacent conveying module. This makes it possible to use a very simple construction for the main frame, in spite of the possibility to move individual intermediate conveying modules transversely to the direction of transport.

As regards the most downstream and/or the most upstream conveying module, which cannot be regarded as conveying modules positioned between other conveying modules, of course, on the sides of which legs of the main frame will generally be mounted in practice, which legs interfere with the guiding of the most downstream and/or the most upstream conveying module in lateral direction from their active position, it is advantageous if the most downstream and/or the most upstream conveying module is (are) pivotable about a horizontal pivot axis that extends transversely to the direction of transport. Said pivotability makes it possible to use smaller dimensions for the most downstream and/or the most upstream conveying module, so that it will nevertheless be possible to guide the most downstream and/or the most upstream conveying module sideways past a leg of the main frame and thus pass the leg in question.

The most downstream and/or the most upstream conveying module preferably engage(s) an adjacent conveying module upon pivoting, so that few if any adaptations of the main frame are required for realising the aforesaid pivotability. The most downstream and/or the most upstream conveying module pivots about the point of engagement with the adjacent conveying module in question, as it were, and can be moved sideways, being suspended from said conveying module, in a manner comparable to the manner in which the intermediate conveying modules are moved.

In particular in order to enable a sufficient degree of pivoting, it is preferable if the conveying modules are at least substantially triangular in shape when seen in side view.

The use of a number of parallel conveyor belts for each conveying module presents this problem that each of said conveyor belts must be maintained at the correct tension in use. Naturally it is possible, also within the scope of the present invention, to provide separate tensioning means for each of said conveyor belts for this purpose. The drawback of such an embodiment, however, is that the conveying modules will become relatively complex in that case on account of all the features that are required for individually tensioning the parallel conveyor belts. It is quite preferable within this framework if a tensioning roller is provided for each conveyor belt of each conveying module, which tensioning roller abuts against the associated conveyor belt over part of its circumference, wherein the tensioning rollers of each conveying module are pivotable about a pivot axis with respect to a tensioning frame that is kept under tension with respect to the frame, and wherein the tensioning rollers are of a springy type, so that at least the part of the circumference of the tensioning rollers that abuts against the associated conveyor belts can spring inwards and outwards under the influence of the tensile force in the associated conveyor belt. An important advantage that is obtained in this manner is the fact that relatively simple features suffice for maintaining the parallel conveyor belts at the correct tension. The pivot axes for each tensioning roller need not necessarily be coaxial, although this may be preferable according to a preferred embodiment yet to be discussed. It should be realised within the framework of the present preferred embodiment that even if the parallel conveyor belts would have the same length upon installation of the conveyor system, said length will change in practice due to be elongation of the conveyor belts, partly in dependence on the loads to which the individual parallel conveyor belts are subjected in use.

With regard to the above preferred embodiment, the present invention further recognises that this principle can be used not only in a conveyor system for influencing the spacing between successive objects during transport thereof in a direction of transport between a charge end and a discharge end, but in general also in a conveyor system for transferring objects during transport thereof in a direction of transport between a supply conveyor and a discharge conveyor, which conveyors extend at an angle ranging between 0° and 90° relative to each other. According to the present invention, such a conveyor comprises a conveying module with a frame and a number of parallel endless conveyor belts which are passed over pulleys provided at ends of the conveying modules, which pulleys are rotatable with respect to the frame, wherein individual pulleys are provided for each conveyor belt at various longitudinal positions of the conveying module, at least at the discharge end, as well drive means for driving the conveyor belts, wherein a tensioning roller is provided for each conveyor belt, which tensioning rollers abut against the respective associated conveyor belts over part of their circumference, wherein said tensioning rollers can pivot about a pivot axis with respect to a tensioning frame that is kept under tension with respect to the frame, and wherein the tensioning rollers are of a springy type, so that at least the part of the circumference of the tensioning rollers that abuts against the associated conveyor belts can spring inwards and outwards in radial direction with respect to the associated axes of rotation under the influence of the tensile force in the associated conveyor belt. The invention makes it possible to use a simpler construction for such conveyor systems than for prior art conveyor systems having the same functionality.

Preferably, the tensioning rollers abut against the associated conveyor belts below the central axes of the pulleys.

Alternatively, a pulley itself may function as a tensioning roller, so that the conveying module can have relatively limited overall height as the endless conveyor belt in that case only needs to comprise a forward portion (in the direction of transport) and a parallel return portion a short distance below said forward portion. In such a preferred embodiment, the other pulley would be used for driving the parallel conveyor belts.

A very advantageous preferred embodiment is characterized in that the tensioning rollers of each conveying module are formed by longitudinal portions of an at least originally common tensioning roller having a length such that it extends over at least two adjacent conveyor belts and preferably over all the adjacent conveyor belts of the associated conveying module. The fact is that such tensioning rollers can be produced at relatively low cost because there is no need for every conveyor belt to have its own tensioning roller to be provided on the common axis of rotation.

In order to prevent adjacent tensioning rollers from influencing each other by springing inwards and outwards, it is advantageous if the common tensioning roller between the longitudinal portions has a reduced diameter.

As regards the use of springy type tensioning rollers according to the above-described preferred embodiments, it generally applies that it is furthermore preferable if one common axis of rotation forms the axis of rotation of all the tensioning rollers, so that one and the same, common axis of rotation element can be used for all the tensioning rollers of a conveying module.

The present invention furthermore relates to a method of maintaining a conveying module having a broken conveyor belt positioned between other conveyor belts, which conveying module forms part of a system according to the invention comprising a number of conveying modules as described above, which method comprises the steps of:
    removing the broken conveyor belt, if it is still present,
    moving at least one conveyor belt one position over the pulleys to the original position of the broken conveyor belt, in such a manner that an empty position where no conveyor belt is present is created on the outer side of the module.

In this way it is readily possible to fill the position of a broken conveyor belt with an adjacent conveyor belt, insofar as this should be necessary, by moving adjacent conveyor belts towards the original position of the broken conveyor belt. An empty position is (temporarily) created on one side of the conveying module in that case, which is less objectionable than an empty position between the outer conveyor belts of a conveying module. Said empty position may be filled with a new conveyor belt at a later point in time, for example when sufficient time is available.

More specifically, it is preferable in that case if the method comprises the steps of:
    clearing at least one transverse side of the conveying module,
    moving all the conveyor belts between the cleared transverse side and the original position of the removed conveyor belts one position over the pulleys in the direction of the original position of the removed conveyor belt,
    adding a conveyor belt over the pulleys on the cleared transverse side from said cleared transverse side.

Said clearing of the transverse side of the conveying module can take place in a very suitable manner by moving the conveying module sideways, making use of the guide means as already explained above in the description of certain preferred embodiments of the conveyor system according to the invention.

As an alternative solution to the problem regarding the true running of a conveyor belt over pulleys as described in the introduction, the present invention also relates to a conveyor system for influencing the spacing between successive objects during transport thereof in a direction of transport between a charge end and a discharge end, comprising a number of end-to-end conveying modules, a main frame, to which the conveying modules are connected, each conveying module comprising a frame and at least one endless conveyor belt passed over pulleys at the front side and the rear side of the conveying module in question, which pulleys are rotatable with respect to the frame, as well as drive means with a motor for driving the conveyor belt(s) of the module, said conveyor system further comprising control means for individually controlling the drive means of each conveying module, wherein said at least one conveyor belt is provided with inwardly extending grooves and wherein at least one of said pulleys is circumferentially provided with ribs that fall into said grooves, or wherein at least one of said pulleys is circumferentially provided with grooves and said at least one conveyor belt is provided with inwardly extending ribs that fall into said grooves. Providing said at least one conveyor belt with said grooves or ribs and providing at least one of said pulleys with said ribs or grooves, respectively, achieves that the conveyor belt is retained in lateral direction, as it were, so as to improve the true running of the conveyor belt.

It has become apparent that a favourable effect on the behaviour of the of the conveyor belt as regards the true running thereof is obtained in particular if said grooves and ribs extend in a direction perpendicular to the direction of transport, which advantageously imparts rigidity to the conveyor belt(s) in a direction transversely to the direction of transport, which has an additional favourable effect on the true running thereof.

BRIEF DESCRIPTION OF THE DRAWINGS

The invention will be explained in more detail hereinafter by means of a description of a number of embodiments of the present invention, in which reference is made to the following figures.

DETAILED DESCRIPTION OF THE INVENTION

Figure 1:
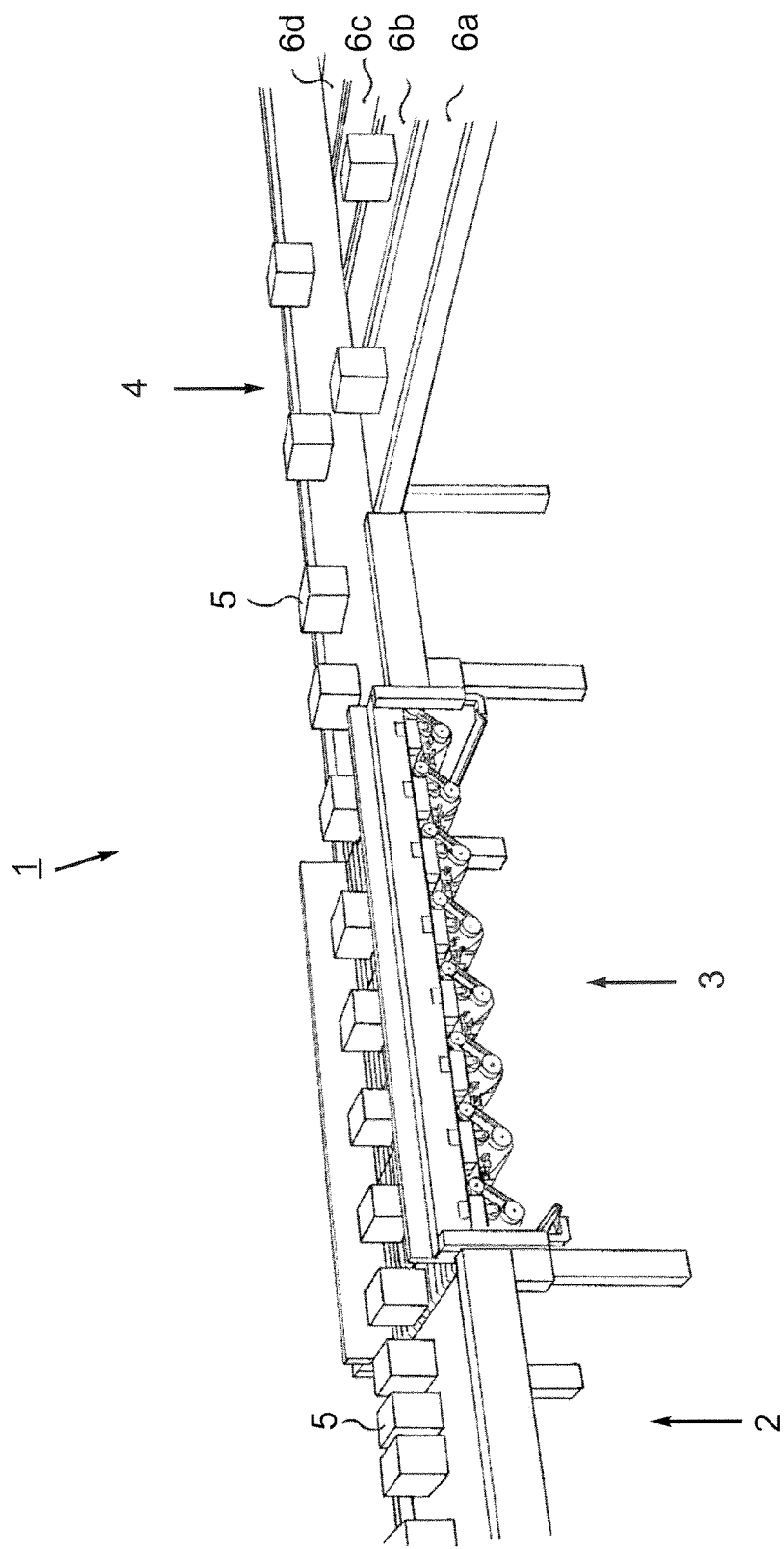
FIG. 1 shows a conveyor system according to the invention, which functions as a transfer conveyor between a supply conveyor and a discharge conveyor.

FIG. 1 shows a conveyor system 1 comprising a supply conveyor 2, a transfer conveyor 3 according to the invention and a discharge conveyor 4, which are positioned end-to-end with respect to one another. The transfer conveyor 3 is capable of influencing the spacing between parcels 5 being supplied to the transfer conveyor 3 by the supply conveyor 2, i.e. enlarge or reduce said spacing so that the products 5 will in any case arrive on the discharge conveyor 4 with a specified spacing between them. Said minimum spacing is required in order to enable automated sorting means (not shown) to sort the parcels 5 sideways onto one of the sorting conveyor is 6a, 6b, 6c, 6d. Such sorting means may for example consist of a pusher on the side of the discharge conveyor remote from the sorting conveyors 6a-6d, or of shoes forming part of the discharge conveyor 4, which can move along slats which extend transversely to the direction of transport and which form part of the discharge conveyor 4 as described in European patent application EP 602 694. The transfer conveyor functions not only to ensure that the spacing between products 5 on the discharge conveyor 4 in any case is larger than a predetermined minimum required spacing, but also to ensure that said value is as close to the minimum required value as possible with a view to utilising the sorting capacity on the discharge conveyor 4 as optimally as possible.

Figure 2:
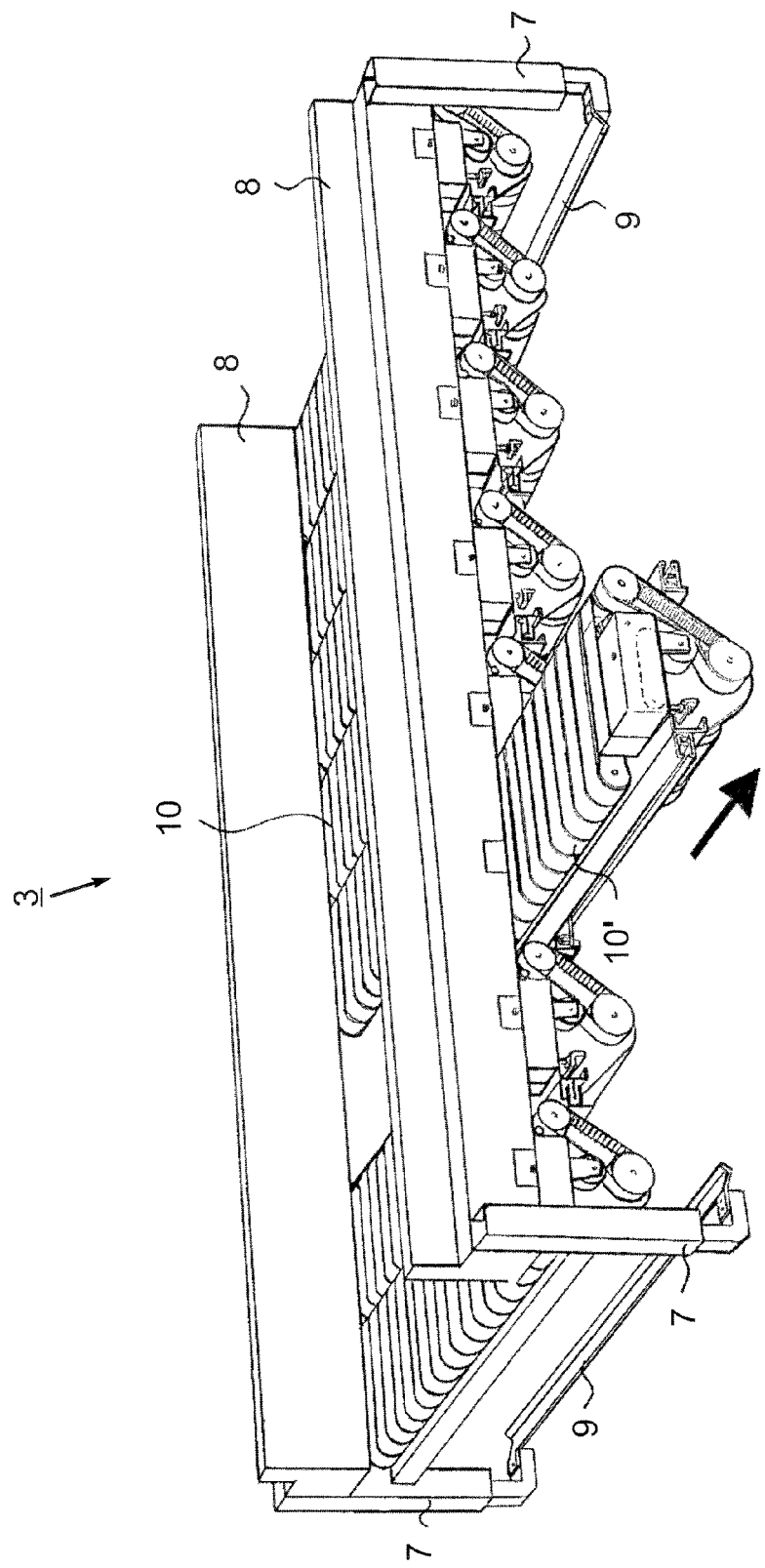
FIG. 2 shows the conveyor system of FIG. 1.

FIG. 2 is a more detailed view of the intermediate conveyor 3 in isolated position. The intermediate conveyor 3 comprises a main frame substantially consisting of four legs on the corners of the frame, two opposed longitudinal girders 8, which each interconnect two legs 7 on one longitudinal side of the main frame, and two cross girders 9, which each interconnect two legs 7 at the ends of the intermediate conveyor 3 at the bottom side thereof. In the present example, the intermediate conveyor 3 furthermore comprises eight conveying modules 10, of which the conveying module 10' that is positioned between other conveying modules 10 has been extended sideways in part in a manner yet to be described in more detail.

Figure 3:
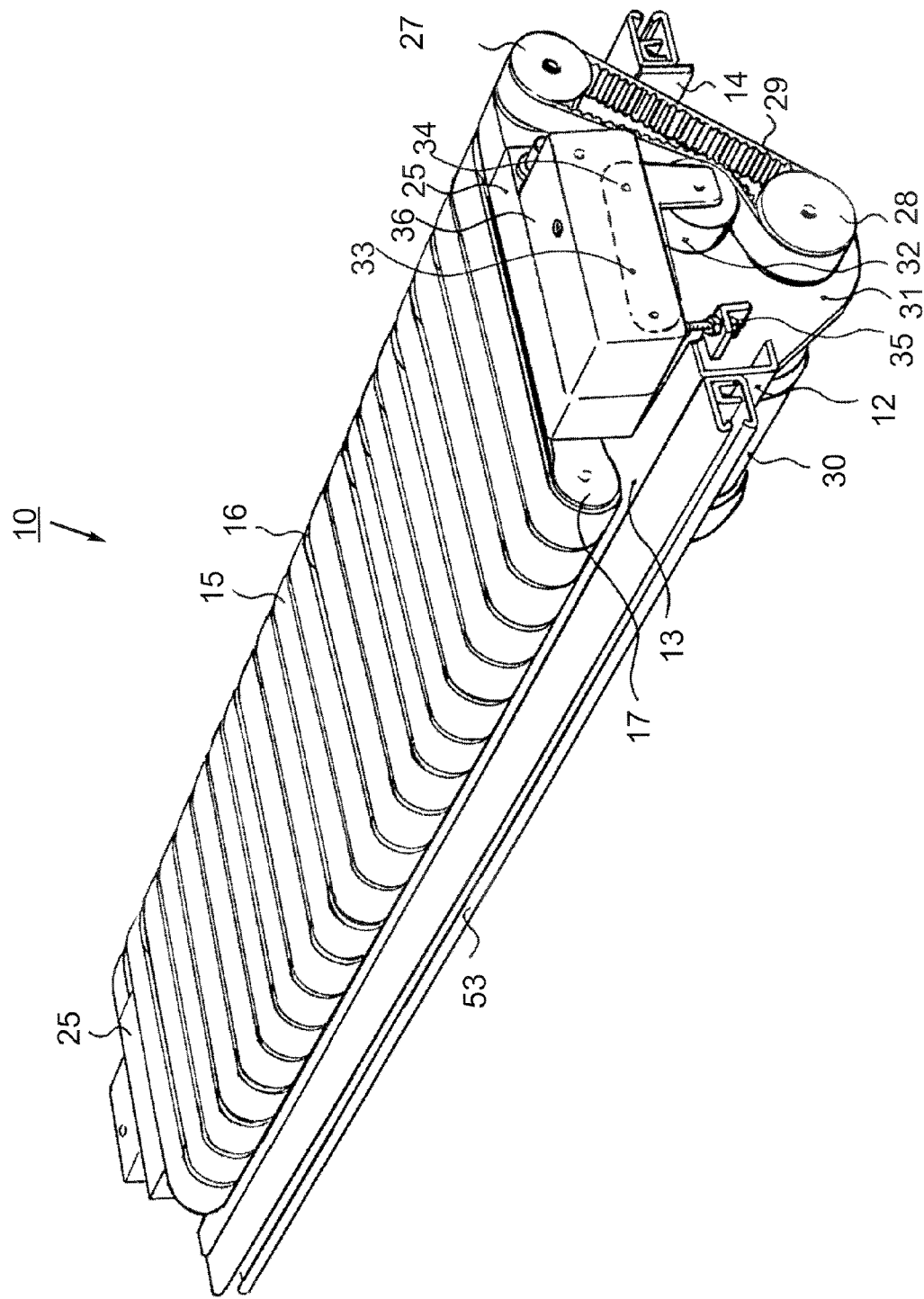
FIG. 3 shows a conveying module that forms part of the conveyor system of FIGS. 1 and 2.
Figure 8:
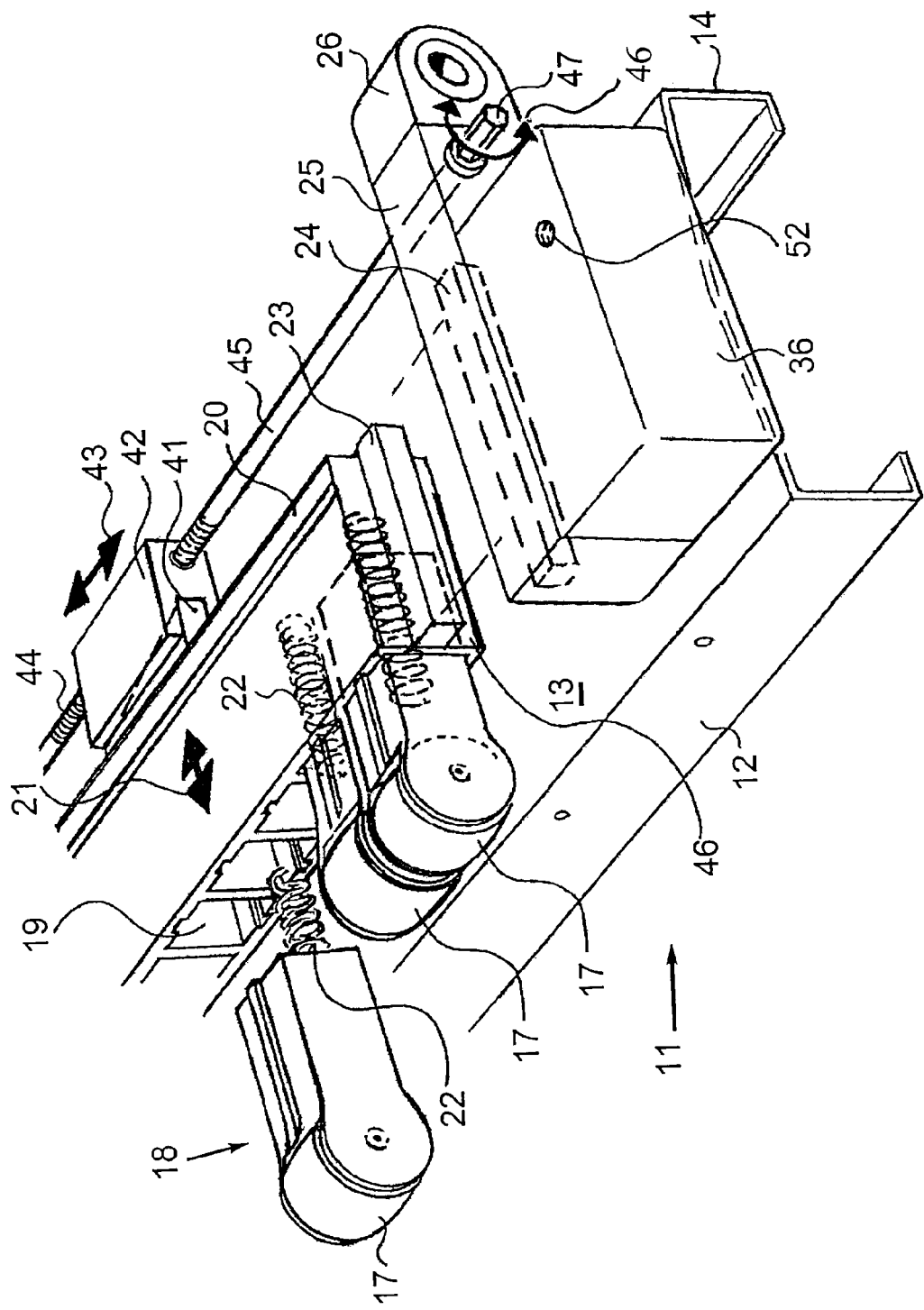
FIG. 8 shows tensioning features for a conveying module as shown in FIG. 3.

FIG. 3 shows an intermediate conveying module 10. Each conveying module 10 comprises a frame consisting of a folded steel plate 11 (see FIG. 8) having a vertical front side 12, a substantially horizontal upper side 13 and a vertical rear side 14. Each conveying module 10 furthermore comprises a number of parallel endless conveyor belts 15 (twenty in this case). Each conveyor belt 15 is passed over a common cylindrical pulley 16 at the front side of the associated conveyor module 10, which pulley has a length equal to the width of all the endless conveyor belts 15, and over individual pulleys 17 at the rear side, which pulleys have a width substantially equal to that of the associated conveyor belts 15. With reference furthermore to FIG. 8, the individual pulleys 17 are barrel-shaped, as it were, with a slightly convex outer surface that is to have a positive effect on the true running of each conveyor 15 on the associated pulley 17.

The pulleys 17 are individually supported at the ends of a support member 18 that has a substantially square, hollow cross-section over the larger part of its length, viz. with the exception of that part of the length of the support member 18 where the pulley 17 is provided. Each support member 18 extends into a correspondingly shaped recess 19 in a tensioning frame 20 with the front part thereof. As a result, the support member 18 can only move in the directions indicated by the double arrow 21 with respect to the tensioning frame 20. A compression spring 22 acts between vertical stop walls that extend transversely to the direction of transport to bound the cavity in the support member as well as in the recess 19, which compression spring functions to maintain the required tension in the conveyor belt 15 that is passed over the pulley 17.

The tensioning frame 20 is at both ends provided with a horizontal guide strip 23 that extends laterally outwards, which strip falls within a guide groove 24, which has a length greater than that of the guide strip 23 and which is provided with a constructional member 25, which, seen in transverse direction, is mounted to the frame 11 at both ends of the parallel conveyor belt 15. A bore 26 is present in the part of the constructional member 25 that is positioned at the front side, within which bore a shaft member for the common pulley 16 can rotate. To that end, a gear 27 is provided coaxial with the common pulley 16 at the outer side of the constructional member 25, which gear 27 is rigidly connected to the shaft member in question for joint rotation. An endless toothed belt 29 is passed over the gear 27 and over the gear 28. The gear 28 is driven by an electric motor 30, which is mounted to the inner side of the vertical mounting plate 31, which is in turn mounted to the frame 11. The toothed belt 29 is correctly tensioned by means of a tensioning roller 32, which presses against the outer side of the toothed belt 29 and which is rotatably supported in one end of the right-angled arm 33, which can pivot about a pivot axis 34 with respect to the frame 11. The pivot axis 34 extends in the longitudinal direction of the conveying module 10 (i.e. transversely to the direction of transport for the transfer conveyor 3) in the corner of the right-angled shape of the arm 33. An adjusting screw 35 is provided for pivoting the right-angled arm 33 about the pivot axis 34, thereby increasing or decreasing the tension of the toothed belt 29, which adjusting screw engages the end of the right-angled arm 33 that is positioned opposite the tensioning roller 32. The (at least substantially) horizontal part of the right-angled arm 33 that is shown in FIG. 3 extends within a housing 36 which is rigidly connected to the frame 11 and in which the right-angled arm 36 is mounted to enable pivoting thereof about the pivot axis 34.

In an alternative embodiment it is conceivable that the tensioning frame forms part of the frame 19 or is at least rigidly connected thereto, or that only the transverse stop walls within the recesses 19 on the side of the support member 19 remote from the pulleys 19 are movable together with the wedge element 41.

The electric motors 30 of each conveying module 10 are individually controlled by control means (not shown), for example on the basis of measurements by means of a light screen or a camera, for example, of the spacing between parcels 5 on the supply conveyor 2 and/or on the transfer conveyor 3 itself. As a result, the individual parcels 5 can move according to an individual velocity profile on the transverse conveyor 3, thus making it possible to change the spacing between the parcels 5 and to present parcels 5 to the discharge conveyor 4 with a desired spacing between them.

An important advantage of the transfer conveyor 3 as described so far is the fact that a number of parallel conveyor belts 15 are used rather than a single, wide conveyor belt as in the prior art. The first advantage that is achieved in this manner is that the behaviour of the individual conveyor belts as regards the true running thereof is much more favourable because of the relatively great length-width ratio of the endless conveyor belt 15. A further important advantage that is achieved is that in the unhoped-for event that the operation of one of the endless conveyor belts 15 is halted, for example because the belt has broken, this does not automatically mean that the operation of the entire conveying module 10 and thus of the transfer conveyor 3 is halted, which might lead to considerable consequential damage.

Figure 7:
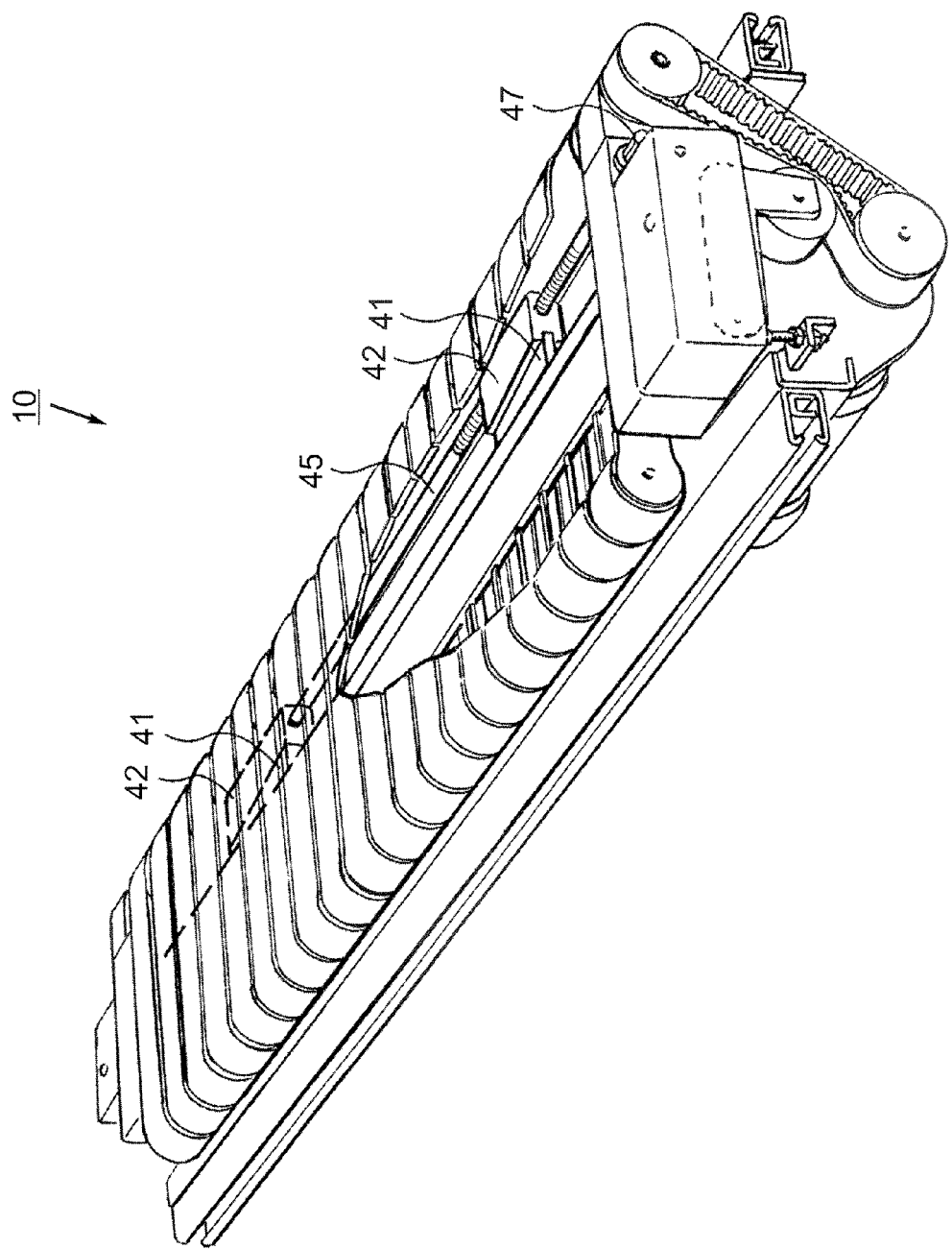
FIG. 7 is a view of the conveying module of FIG. 3 with partially cutaway conveyor belts.

At the front side, the tensioning frame 20 is provided with a wedge element 41 at two longitudinal positions (also refer to FIG. 7), which wedge element mates with a counter wedge element 42. The counter wedge element 42 engages around the upper side and the bottom side of the associated wedge element 41 and can be laterally reciprocated with respect to the frame 11, or more specifically with respect to the tensioning frame 20, in the directions indicated by the double arrow 43. The counter wedge element 42 is to that end provided with internal screw thread at the front side thereof, which screw thread mates with the external screw thread 44 on the tensioning shaft 45, the ends of which are supported in the frame via construction members 25, at the rear side of bores 26 thereof. To rotate the tensioning shaft 45 in the directions indicated by the double arrow 46, the construction member 25 that is shown in FIG. 8 is externally provided with a hexagonal engagement portion 47.

When the counter wedge element 42 is moved to the right, seen in FIG. 8, the tensioning frame 20 is urged away from the tensioning shaft 45 on account of the interaction between the counter wedge element 42 and the wedge element 41, as a result of which the tensioning rollers 17 will press against the inner side of the conveyor belt 15 with increased force so as to tension said conveyor belts. Also the compression springs 22 will be loaded for pressure in that case. On the other hand, when the counter wedge element 42 is moved to the left, seen in FIG. 8, space will be cleared for the tensioning frame 20 to move in the direction of the tensioning shaft 45, which takes place under the influence of the compression springs 22 as long as there is tension on the conveyor belts 15 and which can be effected manually by pushing the tensioning frame 20 forward (seen in the direction of transport) when there is no tension on the conveyor belts 15, or by spring means (not shown) acting between the tensioning frame 20 and the frame 11, which spring means tend to push the tensioning frame forward. Such spring means may be provided in the rear side of guide grooves 24 and press against the end faces 46 of the guide strips 23.

The manner in which individual conveying modules 10 can be detached from the remaining part of the transfer conveyor 3, for example for carrying out maintenance work, will now be explained with reference in particular to FIGS. 4a-6. In the first place it is important in this connection to know that in the position of use the ends of the conveying modules 10 are mounted to the underside of the longitudinal girders 8 by means of bolts 51 that engage in screwed holes 52 of the two housings 36 at the ends of each conveying module 10. Furthermore it is important to note that each conveying module 10 positioned between other conveying modules 10 is provided, both at the front side 12 and at the rear side 14, with a U-shaped section 53, 54, whose open sides are directed to the front and to the rear, respectively. The rear section 53 is connected to the frame 11 at a slightly higher position than the front section 54, the difference in height amounting to half the height of the sections 53, 54. The dimensions of each conveying module 10, the spacing between conveying modules and the length of the legs of the sections 53 and 54 have been selected such that the upper leg of a front section 54 is positioned between the legs of the rear section 53 of a conveying module positioned upstream thereof, without said legs making contact with each other in the position of use, whilst (logically) the upper leg of the front section 54 extends between the two legs of the rear section 53 of a downstream conveying module 10.

Unscrewing the bolt 51 (FIG. 4*b*) will lead to the conveying module in question moving downwards as indicated by the arrows 55, as a result of which the legs of the section 53 will be supported on the legs of the section 54 of the upstream conveying module 10, whilst the upper leg of the front section 54 will be supported on the lower leg of the section 53 of the downstream conveying module 10. The legs of the sections 53, 54 of the adjacent conveying modules 10 on which the aforesaid legs of the sections 53, 54 of the conveying module in question will be supported can subsequently function to guide the movement in the lateral direction of the conveying module in 10 under the longitudinal girder 8, as shown for one conveying module 10' in FIG. 2. If desired, the conveying module 10' can thus be removed in its entirety and be exchanged for another conveying module. Alternatively it is also readily possible to arrange for the conveying module 10' to have a free end on the side of the conveying module 10 remote from the electric motor 30 for the purpose of mounting a conveyor belt 15, which will be discussed in more detail yet with reference to FIGS. 9*a* and 9*b*.

Figure 4A:
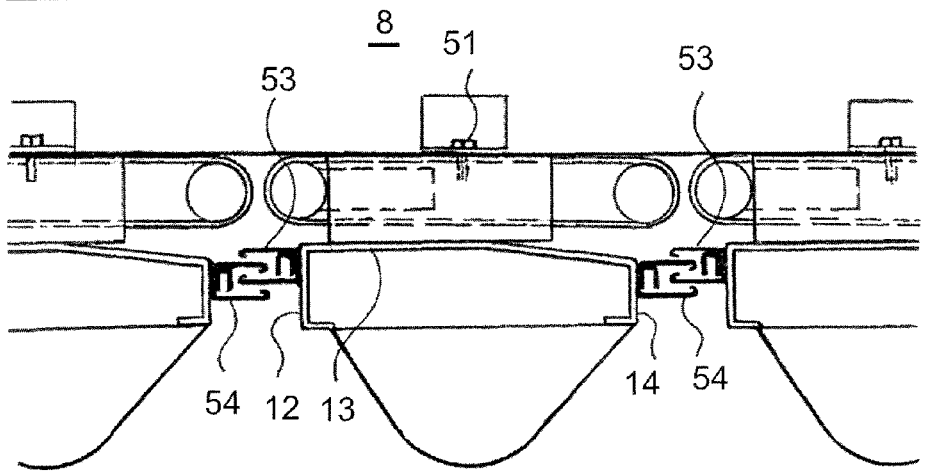
FIGS. 4a and 4b show in side elevation two successive situations during use and during (temporary) (partial) removal, respectively, of an intermediate conveying module.
Figure 4B:
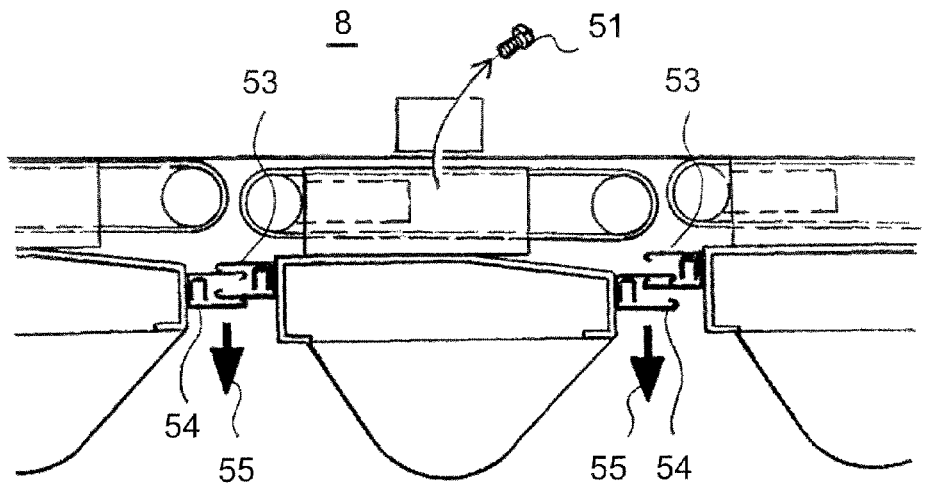

It is not possible for at least two reasons to remove the conveying modules 10 that are positioned at the front side and the rear side of the transfer conveyor 3 in the same manner as the intermediate conveying modules 10 as explained with reference to FIGS. 4*a* and 4*b*. In the first place, a leg 7 physically stands in the way. Furthermore, there is only one conveying module adjacent to the conveying modules 10 in question, so that said conveying modules cannot be supported on an adjacent conveying module 10 at the respective end of the transfer conveyor 3.

Figure 5A:
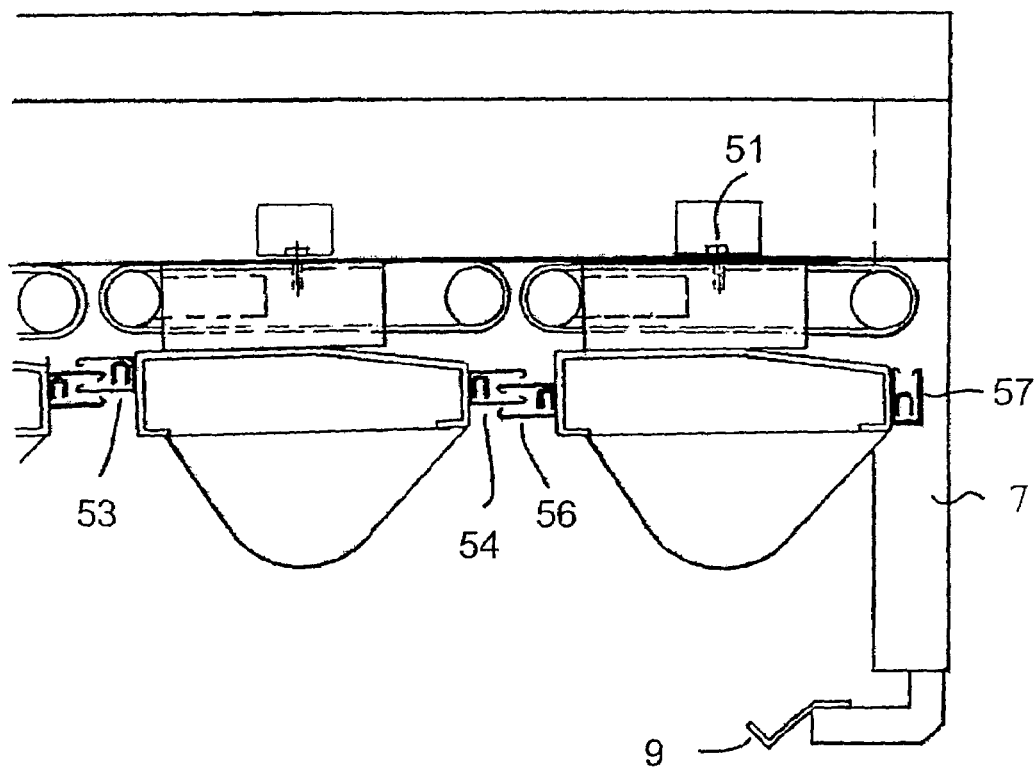
FIGS. 5a and 5b show in side elevation two successive situations during use and during (temporary) (partial) removal, respectively, of a conveying module positioned at an end of the conveyor system.

FIG. 5*a* shows the most downstream conveying module 10 of the transfer conveyor 3. This conveying module 10, too, is provided with a rear section 56 at the rear side 12, although said section 56 is provided at a lower position than the rear sections 53 of the intermediate conveying modules 10, and in such a manner that the upper leg rather than the lower leg of the rear section 56 extends between the legs of the front section 54 of the conveying module 10 positioned upstream thereof. In addition to that, the most downstream conveying module is provided with a U-shaped section 57 at the front side 14 thereof, with this difference that the open side of said U-shaped section 57 is directed upwards, as a result of which the U-shaped section 57 takes up less space, seen in the direction of transport.

Figure 5B:
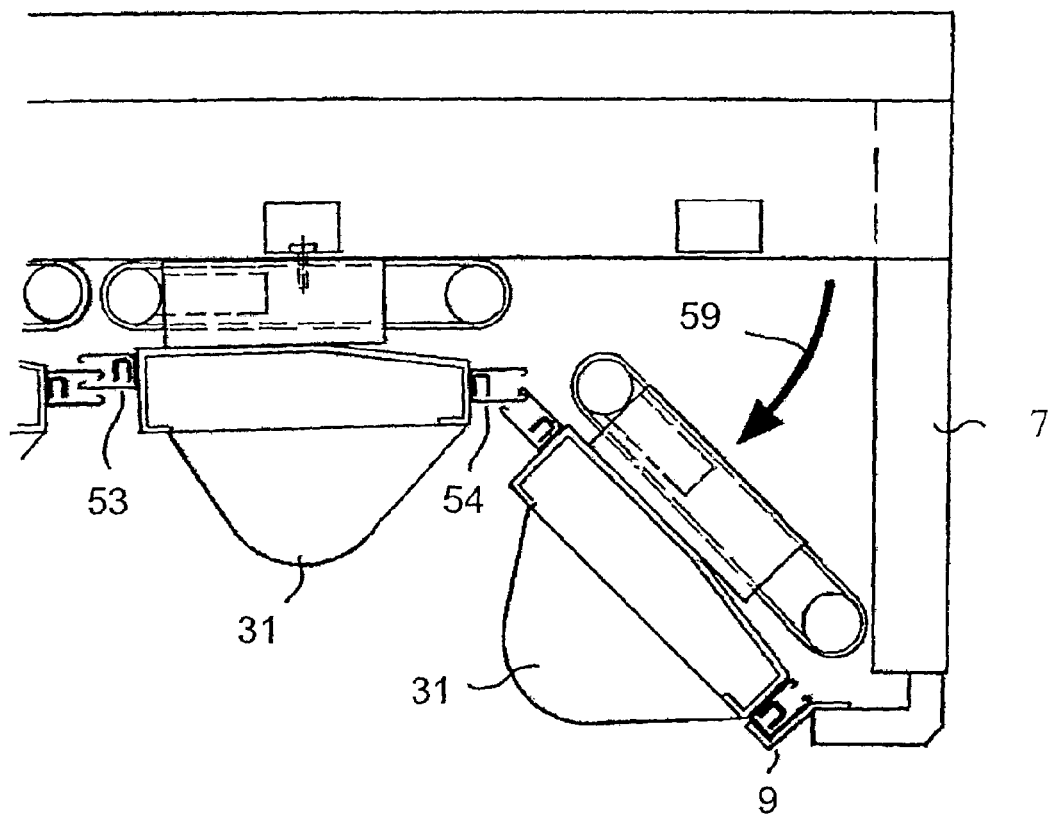

As with the intermediate conveying modules 10, the associated bolts 51 are unscrewed for removing the most downstream conveying module and 10, as a result of which the upper leg of the rear section 56 of the most downstream conveying module 10 will be supported at the rear side on the lower leg of the section 54 of the conveying module 10 positioned upstream thereof. The two legs in question, like all the other legs of the other sections 53, 54, 56, 57 for that matter, are hook-shaped at their ends, causing the legs in question to interlock and form a hinge, as it were, about which the most downstream conveying module 10 can pivot downwards in the direction indicated by the arrow 59 until the moment when the back of the front section 57 of the most downstream conveying module 10 abuts against the cross girder 9, which functions as a fixed guide. As FIG. 5*b* shows, the most downstream conveying module 10 just extends on the inner side of the leg 7 in that pivoted position, as a result of which the most downstream conveying module 10 can be moved over the front section 54 of the upstream conveying module 10 and the fixed guide 9, perpendicular to the plane of drawing. In order to enable the most downstream conveying module 10 to pivot to a sufficient degree in the direction indicated by the arrow 59, it is important that the conveying modules 10 are triangular in shape, seen in perpendicular a view, which triangular shape is defined in particular by the shape of the mounting plate 31, which has a triangular shape with the vertex facing downwards.

Figure 6:
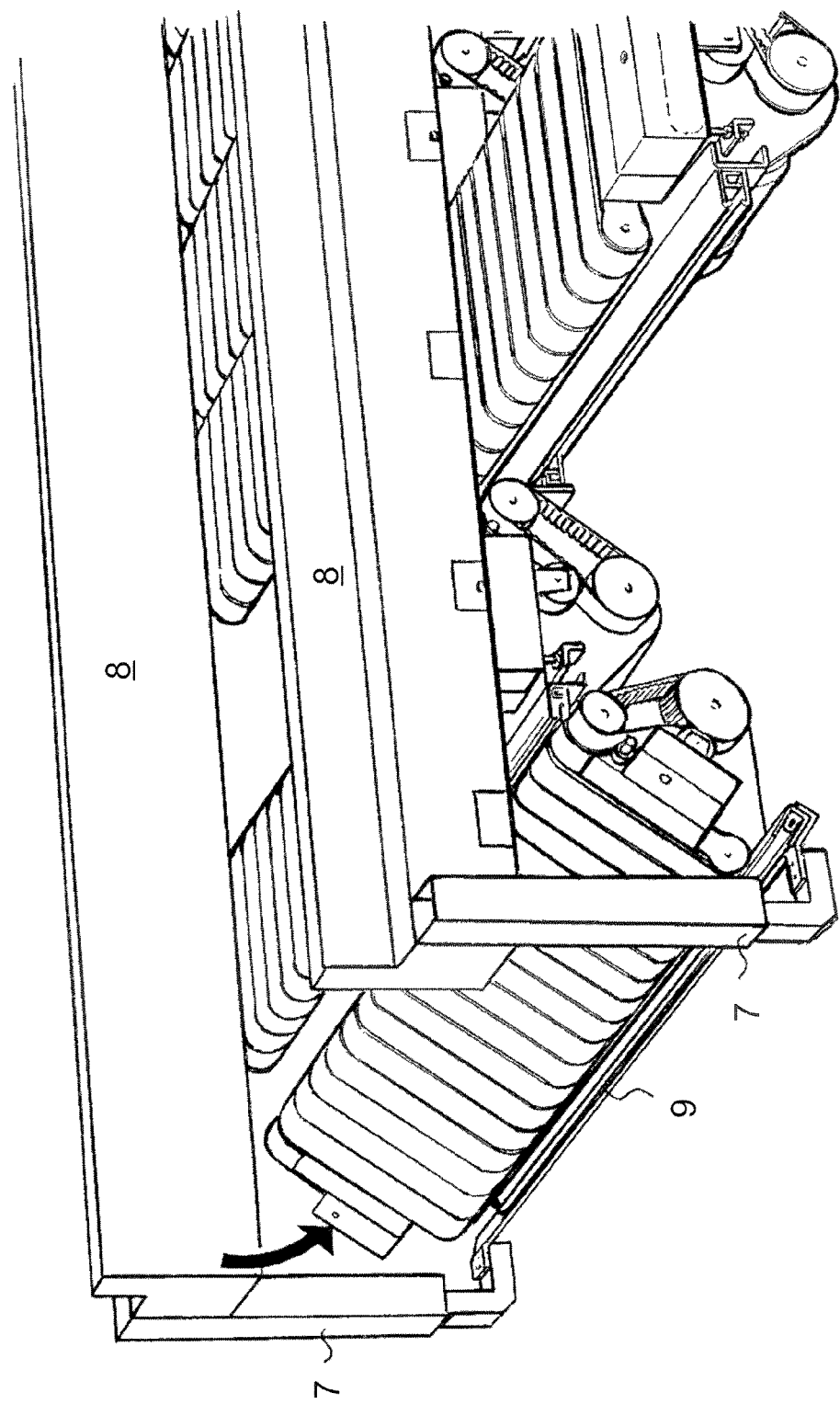
FIG. 6 shows a part of the conveyor system during (partial) removal of an intermediate conveying module as well as a conveying module positioned at an end of the conveyor system.

FIG. 6 shows by way of illustration the transfer conveyor 3 in the condition in which the most upstream conveying module 10 has been (temporarily) pivoted downwards in a manner comparable to the manner as described for the most downstream conveying module 10 with reference to FIGS. 5*a* and 5*b*, whilst an intermediate conveying module 10' is shown to be extended.

Figure 9A:
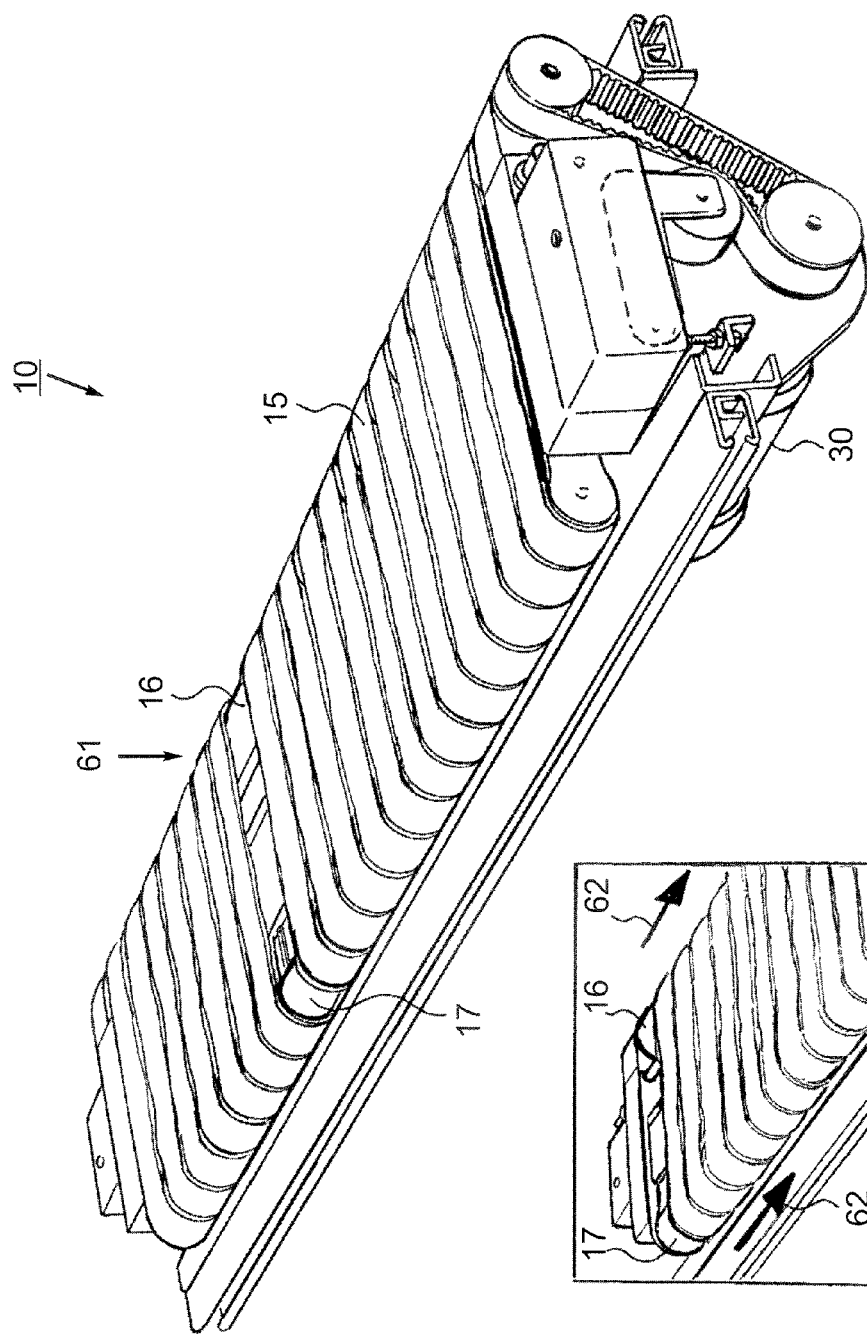
FIGS. 9a and 9b show two successive situations during repair of an intermediate conveyor belt of a conveying module.
Figure 9B:
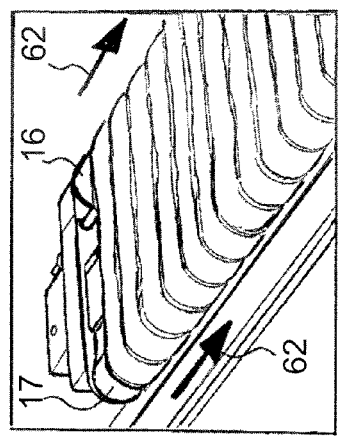

FIGS. 9*a* and 9*b* show how it is possible in a relatively simple manner to exchange a (broken intermediate) conveyor belt 15 (which has already been removed in FIG. 9*a*) at the location indicated at 61, in which connection it is noted that failure of the conveyor belt 15 need not necessarily lead to failure of the entire conveying module 10 and thus of the entire transfer conveyor 3, so that it is possible to carry out such an exchange at a suitable point in time, when the transfer conveyor 3 is not required to function. The tension on the conveyor belts 15 is released (FIG. 9*a*) by suitably turning the tensioning shaft 45 as explained in the foregoing, in particular with reference to FIG. 8. In this way it becomes possible to move the conveyor belts 15 that are positioned at the end of the open position 61 remote from the electric motor 30 in FIG. 9*a* in the direction of the free position 61 as indicated by the arrows 62, thus creating a free position for a conveyor belt 15 at the end remote from the electric motor 30 (FIG. 9*b*). To add a new conveyor belt 15 at the location of the free position, it is important that a free end is created at the conveying module 10. The conveying module is to that end extended sideways, as explained with reference to FIGS. 4*a*-5*b*, for example. Thus a possibility is created to fit a new conveyor belt 15 and subsequently, in random order, return the conveying module to its operative position and tension the conveyors belts 15 again by suitably turning the tensioning shaft 45.

Figure 10:
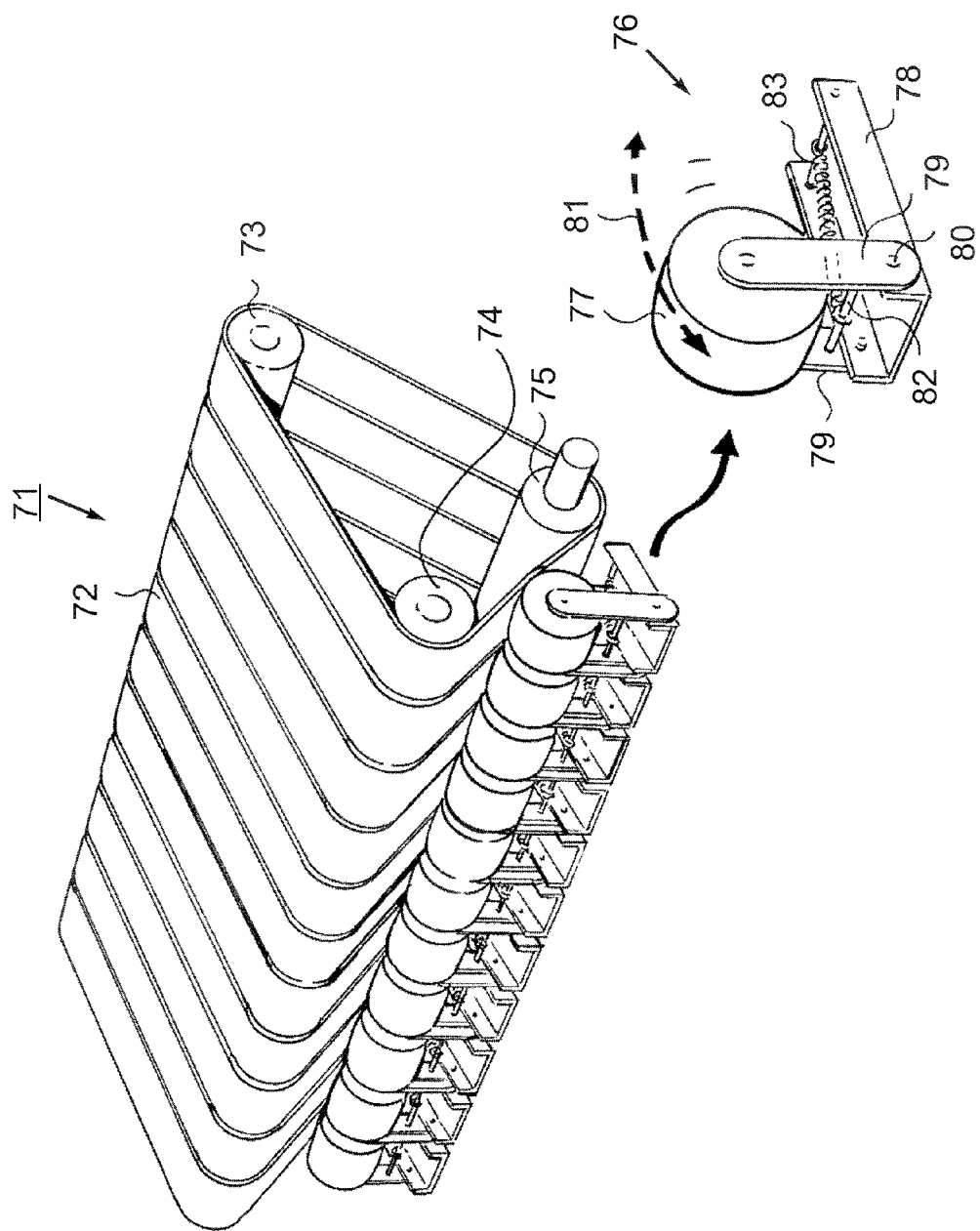
FIG. 10 shows alternative features for tensioning the conveyor belts of a conveying module.

FIG. 10 shows the principle of an alternative embodiment for a conveying module 71. The conveying module 71 comprises a number of parallel endless conveyor belts 72, which are passed, in the form of a triangle, over two common pulleys 73, 74 positioned at the same vertical level, and a tube motor 75 positioned under the common pulleys 73, 74, centrally between said pulleys. A tensioning unit 76 is provided for each conveyor belt 72. Each tensioning unit 76 has a tensioning roller 77 that presses against the outer side of the associated conveyor belt 72 at a position between the common pulley 74 and the tube motor 75. Each tensioning unit 76 further comprises a fixed arm 78 that is fixedly connected to the frame (module) of the conveying module 71 and two pivoting arms 79 capable of reciprocating pivoting movement about the pivot axis 80 in the direction indicated by the arrow 81, between which the tensioning roller 77 is rotatably mounted. The pivoting arms 79 are interconnected by means of a rod 82 above the pivot axis 80 and below the tensioning roller 77. A tension spring 83 is operative between the end of the fixed arm 78 remote from the pivot axis and the rod 82, which tension spring 83 tends to press the tensioning roller 77 against the outer side of the associated conveyor belt 72.

The tensioning units 76 are disposed side by side. To release the conveyor belts 72, it is preferable if the adjacent tensioning units 76 are mounted to a separate tensioning frame, which can be detached from the frame of the conveying module 71 for moving the tensioning roller 77 and the conveyor belts 72 apart.

Figure 11:
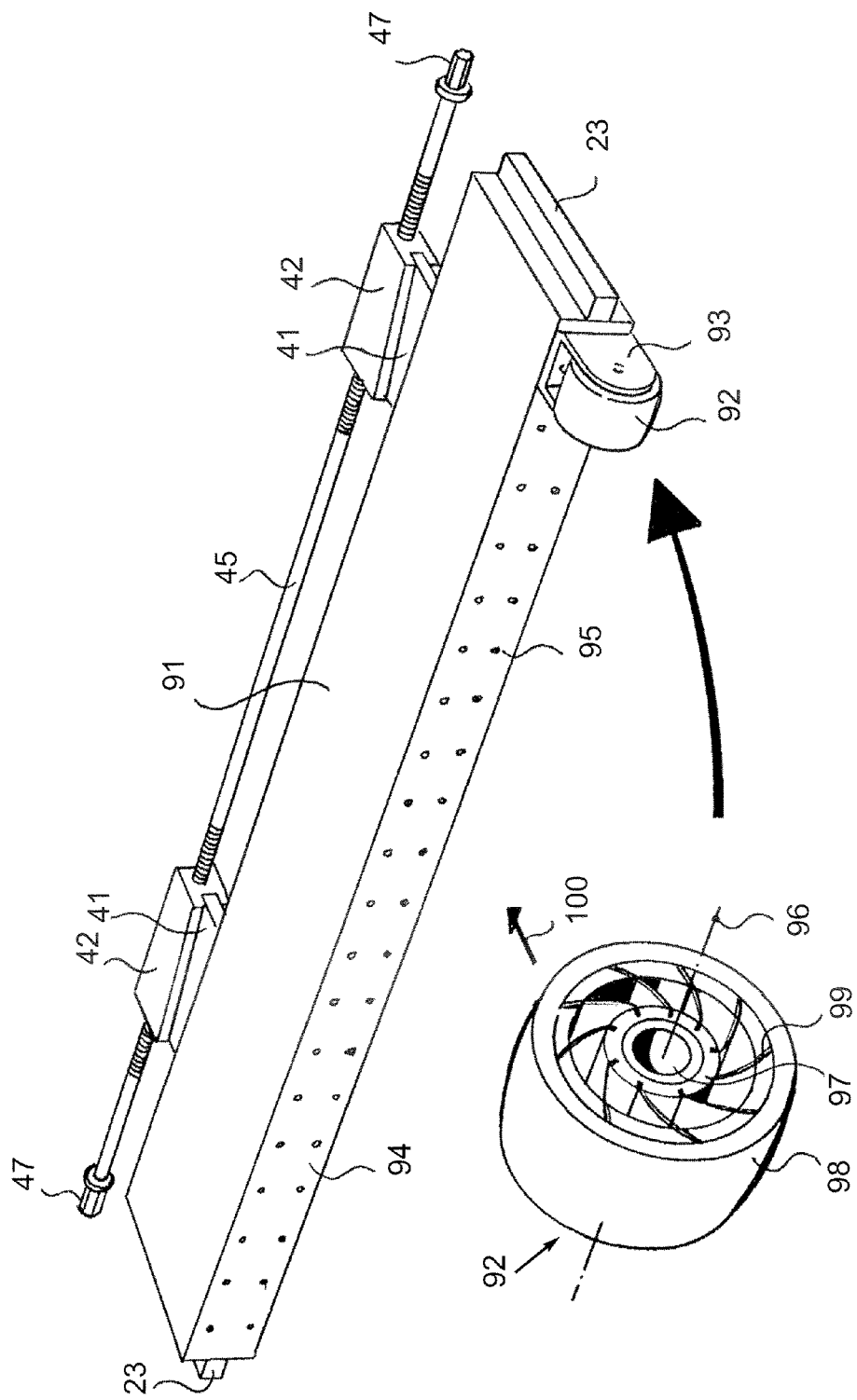
FIG. 11 shows a tensioning frame for a conveying module fitted with a tensioning roller.

FIG. 11 shows a tensioning frame 91 that can function as an alternative to the tensioning frame 20 in FIG. 8. Insofar as applicable, like parts are indicated by the same numerals. A pulley 92 is provided for each of the parallel conveyor belts 15 (only one pulley being shown in FIG. 11), which pulley is mounted, being rotatable about its central axis 96, between two rearwardly extending legs of a U-shaped section 93, the web of which U-shaped is mounted to the rear side 94 of the tensioning frame 91, which is to that end provided with screwed holes 95.

The pulleys 92, which may be produced by means of injection-moulding, for example, each comprise an inner ring 97 and an outer ring 98, which are both made of a relatively hard material, for example a metal. The outer ring 98 has a slightly convex surface so as to make it easier for the associated conveyor belt 15 to run true. The inner ring 97 and the outer ring 98 are interconnected via leaf springs 99 made of a plastic material or a metal, for example. The leaf springs 99 extend substantially tangentially from the inner ring 97 and join the inner side of the outer ring 98 at an angle of approximately 45°. In unloaded condition, the central axis of the outer ring 98 coincides with the central axis 96 of the inner ring 97. In loaded condition, however, the outer ring 98 will move in the direction indicated by the arrow 100 with respect to the central axis 96 under the influence of the tensile force in the associated conveyor belt 15, against the spring action of the leaf springs 99, which will deform, of course, and thus enable movement of the outer ring 98. The important advantage that is achieved in this manner is the fact that a much simpler construction can be used for the tensioning frame 91 than for the tensioning frame 20 according to FIG. 8, for example, and that furthermore fewer separate additional features are required in order to ensure the required tensile force in the various conveyor belts 15.

Figure 12:
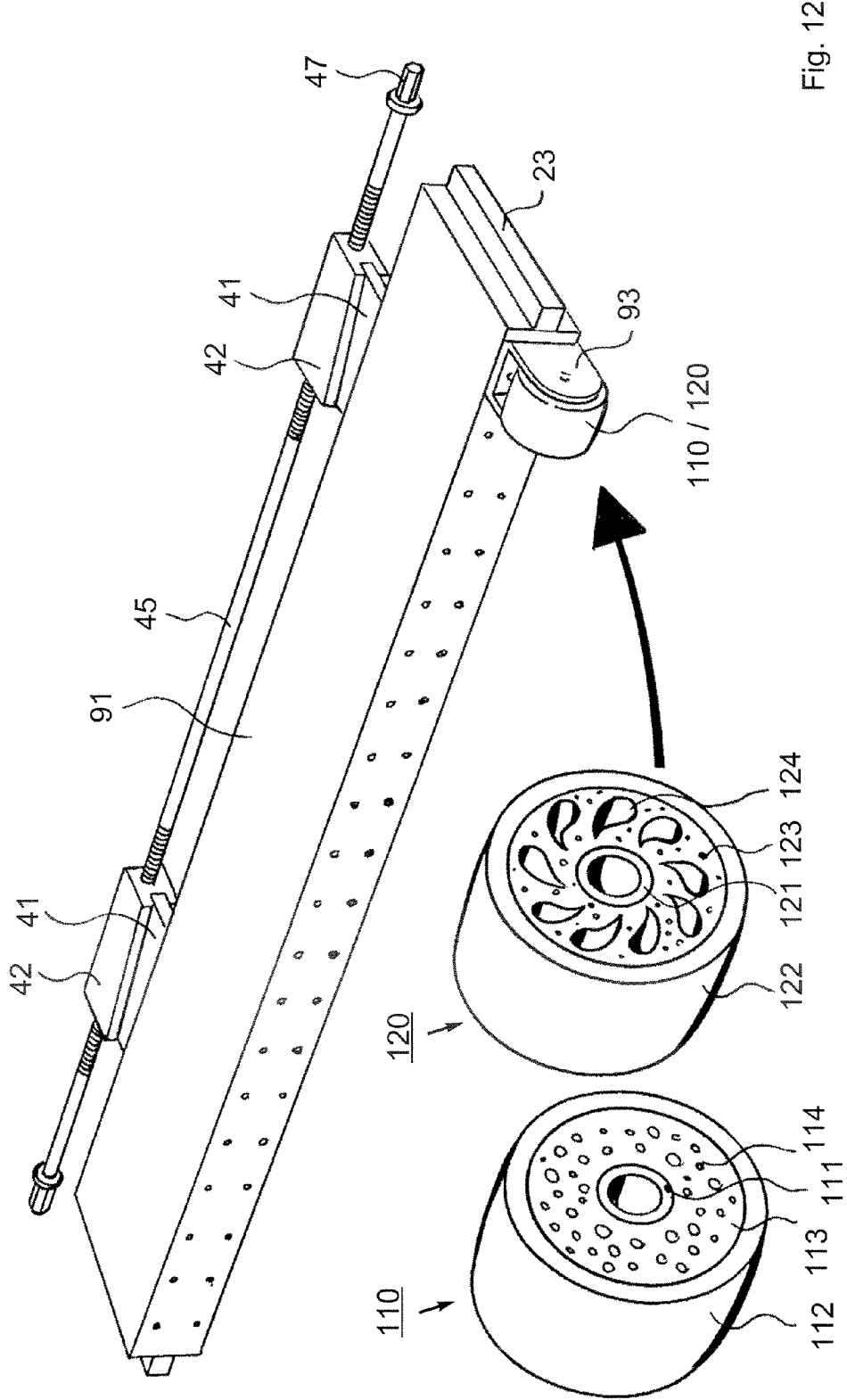
FIG. 12 shows a tensioning frame identical to the tensioning frame of FIG. 11, in which different tensioning rollers are used.

A similar advantage applies with regard to the pulleys 110, 120 in FIG. 12. The pulleys 110, 120 each have an inner ring 111, 121 and an outer ring 112, 122. The space between the respective inner rings 111, 121 and outer rings 112, 122 is filled with a foam-like material 113, 123, for example polyurethane. Because of its nature, the foam-like core 113, 123 can deform under the influence of external forces being exerted on the outer ring 112, 122, as a result of which the central axis of the outer ring 112, 122 will be shifted with respect to the central axis of the inner ring 111, 121 in the direction of the force being exerted thereon. Air chambers 114, 124 are provided in the foam-like core 113, 123 to make it easier for said core to deform.

Figure 13:
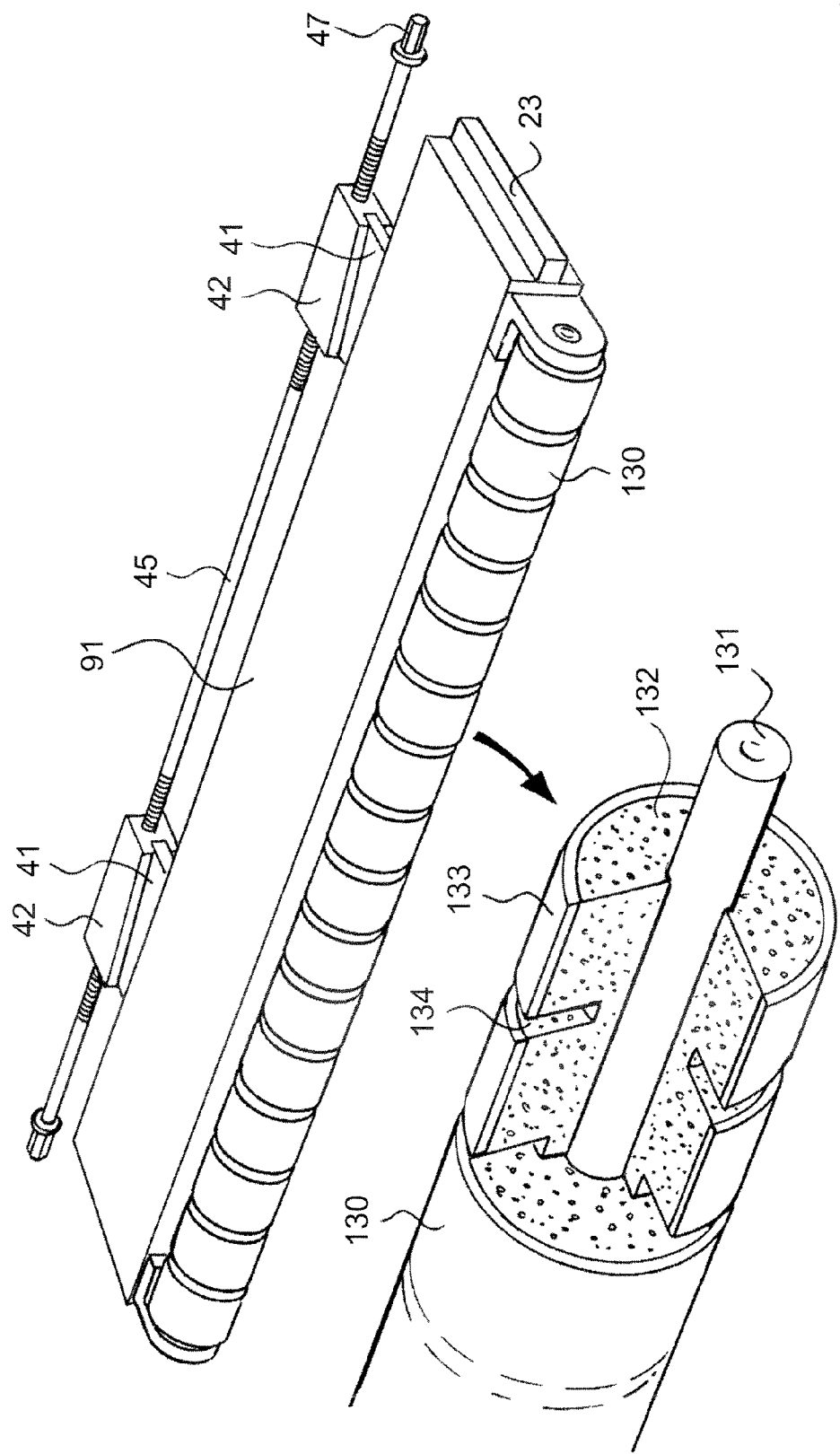
FIG. 13 shows the tensioning frame of FIG. 11, in which a common tensioning roller is used.

FIG. 13 shows a further alternative for using the pulleys 92, 110 and/or 120 according to FIGS. 11 and 12. In FIG. 13 one common pulley 130 having a common axis of rotation is used instead of a number of individual pulleys. Said common pulley 130 comprises a single shaft member 131 extending the full length of the tensioning frame 91, around which a cylindrical foam core 132 is provided, which is fixedly connected to the shaft member 131. A hard shell 133 has furthermore been provided over the entire length of the common pulley 130 at the time of the original manufacture thereof. The diameter of the common pulley 130 is reduced at regular intervals, viz. at positions between the eventual power will conveyor belts 15. To that end not only parts of the shell 133 have been removed, but also parts of the cylindrical foam core 132, as indicated at 134. By locally reducing the diameter at regular intervals, parts that can function more or less as individual pulleys are formed between the reduced areas, in the sense that local inward springing of a part of the shell 133 will not result in inward springing of an adjacent part of the shell 133 for an adjacent conveyor belt 15 as well. This also depends on the nature of the material of the cylindrical foam core 132, of course, and on the degree to which the diameter has been reduced at the location indicated at 134. It is even conceivable in that connection that material is only removed from the shell 133 and not from the cylindrical foam core 132 when the diameter is being locally reduced. Alternatively it is conceivable within the framework of the present invention to provide the shell 133 only at discrete positions, so that the shell 133 need not be removed at a later stage.

Figure 14:
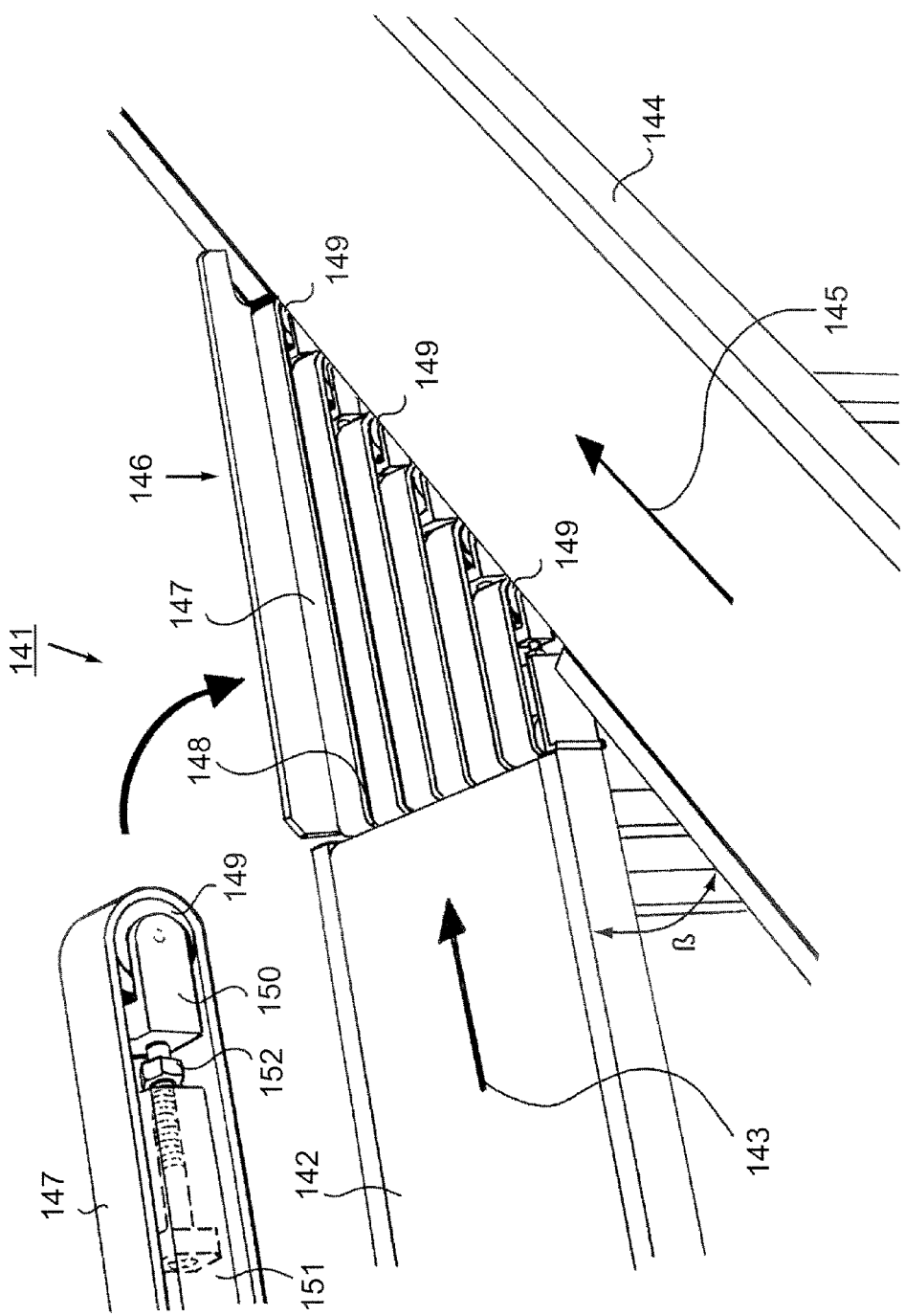
FIG. 14 shows a conveyor system according to the invention at a position where a supply conveyor joins a main conveyor at a non-perpendicular angle.

FIG. 14 shows a conveyor system in which advantageous use can be made of conveying rollers as explained with reference to FIGS. 11 and 12. The conveyor system 141 comprises a supply conveyor 142 having a direction of transport 143 and a discharge conveyor 144 having a direction of transport 145. The direction of transport 143 extends at an angle β of approximately 45° with respect to the discharge conveyor 144, with a transfer conveyor 146 being provided in the transition area between the supply conveyor 142 and the discharge conveyor 144. A specialist term for such a transfer conveyor 146 is "junction". The transfer conveyor 146 is at least substantially triangular in shape, seen in top plan view, so as to enable the transfer conveyor 146 to join the end side of the supply conveyor 142 on the one hand and the longitudinal side of the discharge conveyor 144 on the other hand.

The transfer conveyor 146 comprises a number of endless conveyor belts 147 extending in the direction of transport 143, which are each passed over a common pulley 148 on the side of the supply conveyor 142 and over individual pulleys 149 on the side of the discharge conveyor 144. Because of the triangular shape of the transfer conveyor 146, the individual conveyor belts 147 each have their own individual length, which length is different from that of the other conveyor belts 147. The individual pulleys 149 are mounted between two legs of a U-shaped section 150 in such a manner as to be rotatable about their central axes, which U-shaped section 150 is provided with a tensioning arm 151 at the end thereof, via which arm 151 the position of said section can be adjusted by means of an adjusting screw 152. When a conveyor belt 147 is to be rendered tensionless, for example for carrying out maintenance work, the tensioning arm 151 can be moved in the direction of the supply conveyor 142. The pulley 149 can have a configuration identical to that of the pulley 92 or of the pulley 120, in any case having a hard outer ring/shell and a springy core, so that the outer ring/shell can spring inwards in the direction of the supply conveyor 142, with the central axis of the outer ring/shell being shifted with respect to the original position when the pulley 149 is not loaded. An important constructional advantage that is achieved in this manner is that no additional spring means are required in the transfer conveyor 146 for ensuring the required tensile force in the conveyor belt 147.

Figure 15:
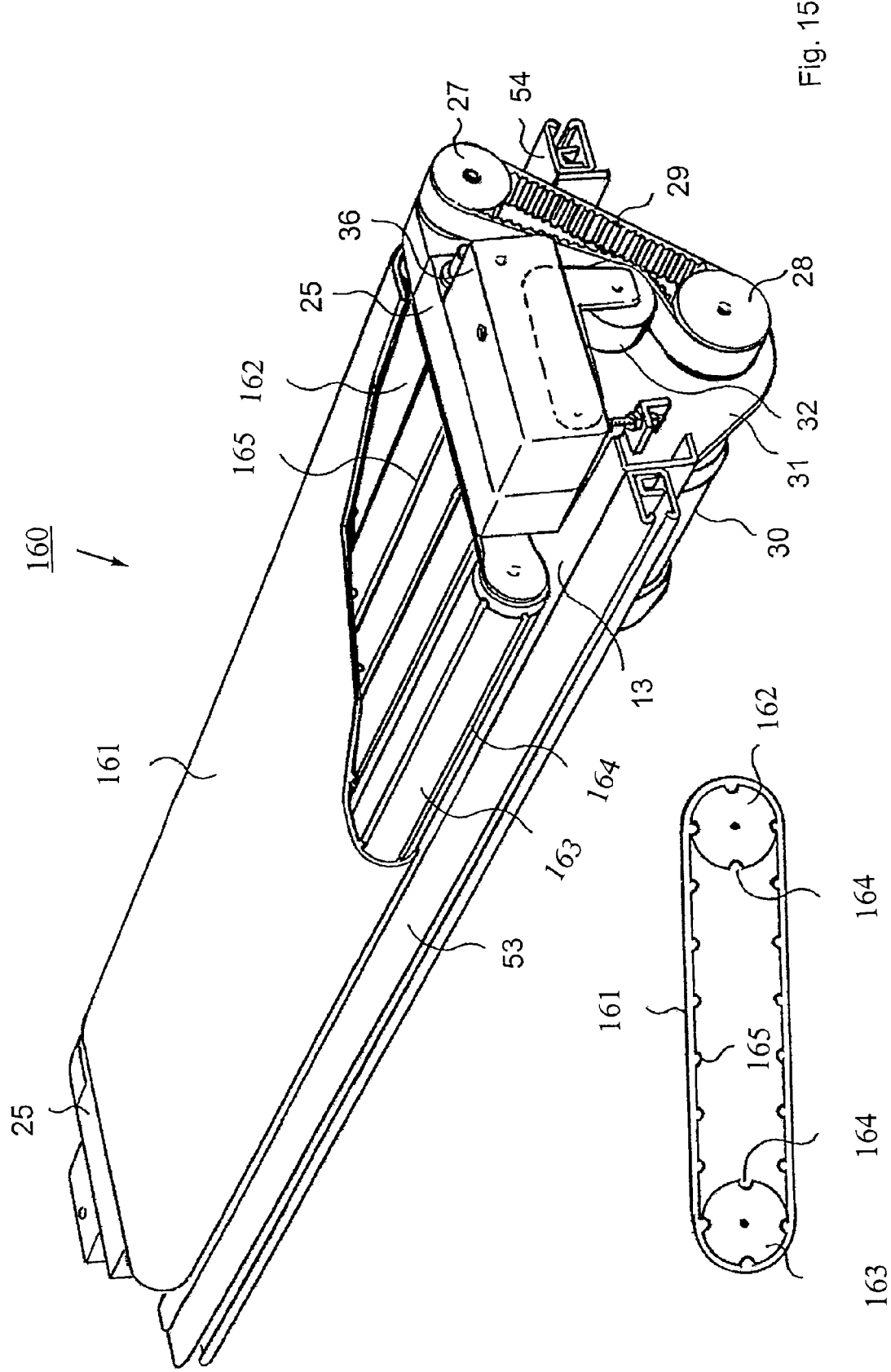
FIG. 15 shows a conveying module with a partially cutaway conveyor belt.
Figure 16:
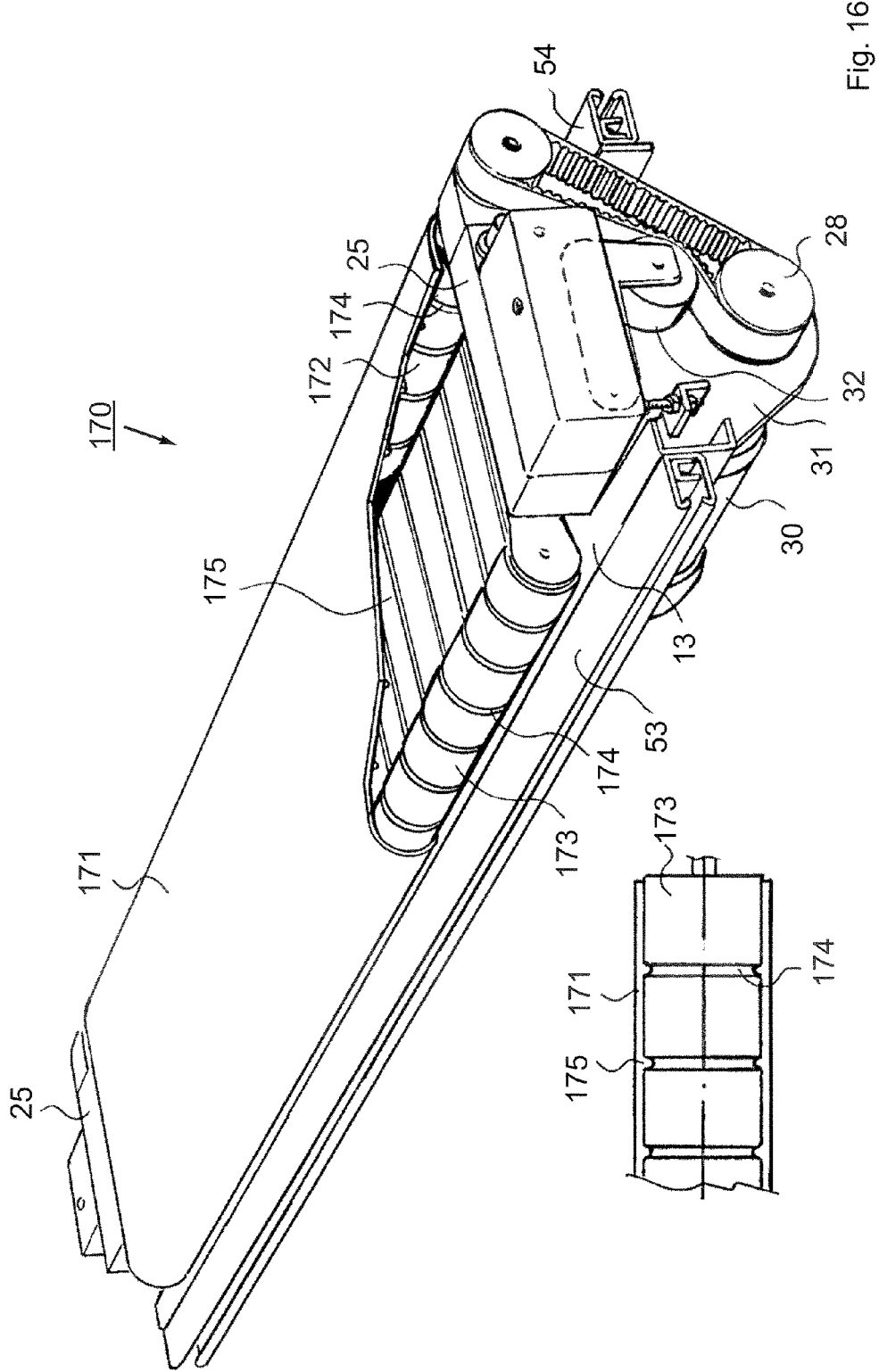
FIG. 16 shows a conveying module that forms part of a conveyor system according to the invention.

FIGS. 15 and 16 show two conveying modules 160, 170, which can function as alternatives to the conveying module 10, as explained in the foregoing in particular with reference to FIG. 3. Like parts will be indicated by the same numerals. One relatively wide conveyor belt 161, 171 is used with the conveying modules 160, 170 instead of a number of parallel, relatively narrow conveyor belts 15, which conveyor belts 161, 171 are passed over a front pulleys 162, 172, respectively, and rear pulleys 163, 173, respectively.

In order to obtain an improved behavior as regards the true running of the relatively short, wide conveyor belts 161, 171, grooves 164, 174 are formed in the pulleys 162,163 and 172, 173, into which inwardly extending ribs 165, 175 of the associated conveyor belts 161, 171 extend. Because of the engagement between the grooves 164, 174 and the ribs 165, 175, the associated conveyor belts 161, 171 do not exhibit any tendency, or at least to a significantly reduced extent, to move sideways off the associated pulleys 162, 163 and 172, 173, in spite of their relatively short length. Thus they exhibit an improved behavior as regards the true running thereof. The difference between the conveying module 160 and the conveying module 170 is that the grooves 164 and the ribs 165 of the conveying module 160 extend transversely to the direction of transport, whilst the grooves 174 and the ribs 175 of the conveying module 170, on the other hand, extend parallel to the direction of transport.

The invention claimed is:

1. A conveyor system for influencing spacing between successive products during transport thereof in a direction of transport between a charge end and a discharge end, comprising:
    a plurality of end-to-end conveying modules, wherein each of the conveying modules includes a frame, a plurality of parallel endless conveyor belts which pass over pulleys provided at a front side and a rear side of the conveying module, the pulleys being rotatable with respect to the frame, and drive means including a motor for driving each of the parallel endless conveyor belts of the conveying module;
    a main frame, to which the conveying modules are connected;
    control means for individually controlling the drive means of each of the conveying modules; and
    guide means for guiding the conveying modules that are positioned between other of the conveying modules in a horizontal direction transverse to the direction of transport.

2. A conveyor system according to claim 1, wherein a most downstream and a most upstream conveying module are pivotable via the guide means about a horizontal pivot axis that extends transversely to the direction of transport.

3. A conveyor system according to claim 1, wherein the guide means comprise guides mounted to each of the conveying modules for guiding an adjacent conveying module.

4. A conveyor system according to claim 1, wherein a most downstream or a most upstream conveying module is pivotable via the guide means about a horizontal pivot axis that extends transversely to the direction of transport.

5. A conveyor system according to claim 4, wherein the most downstream or the most upstream conveying module engages an adjacent conveying module upon pivoting.

6. A conveyor system according to claim 1, wherein the conveying modules have a substantially triangular shape in a side view.

7. A conveyor system according to claim 1, further comprising:
    a plurality of tensioning rollers, wherein a tensioning roller of the plurality of tensioning rollers is provided for each of the plurality of conveyor belts of each of the plurality of conveying modules,
    wherein the tensioning roller abuts against an associated conveyor belt of the plurality of conveyor belts over part of a circumference of the tensioning roller,
    wherein the tensioning rollers of each of the plurality of conveying modules are pivotable about a pivot axis with respect to a tensioning frame that is kept under tension with respect to the frame, and
    wherein each of the tensioning rollers are a springy type so that at least the part of the circumference of the tensioning rollers that abuts against the associated conveyor belts can spring inwards and outwards under an influence of a tensile force in the associated conveyor belts.

8. A conveyor system according to claim 2, wherein the most downstream and the most upstream conveying module engage an adjacent conveying module upon pivoting.

9. A conveyor system according to claim 7, wherein the tensioning rollers abut against the associated conveyor belts below central axes of the pulleys.

10. A conveyor system according to claim 7, wherein the tensioning rollers are a pulley.

11. A conveyor system according to claim 7, wherein the tensioning rollers of each of the conveying modules are formed by longitudinal portions of a common tensioning roller having a length such that the common tensioning roller extends over at least two adjacent conveyor belts.

12. A conveyor system according to claim 11, wherein the common tensioning roller between the longitudinal portions has a reduced diameter.

13. A conveyor system according to claim 7, wherein one common axis of rotation forms an axis of rotation of all of the tensioning rollers.

14. A method of maintaining a conveying module having a broken conveyor belt positioned between other conveyor belts, comprising:
    moving the conveying module in a horizontal direction transverse to a direction of transport of the conveying module;
    removing the broken conveyor belt; and
    moving at least one unbroken conveyor belt one position over pulleys to an original position of the broken conveyor belt, in such a manner that an empty position where no conveyor belt is present is created on an outer side of the conveying module.

15. A method according to claim 14, comprising:
    clearing at least one transverse side of the conveying module;
    moving all the unbroken conveyor belts between the cleared transverse side and the original position of the broken conveyor belt one position over the pulleys in a direction of the original position of the broken conveyor belt; and
    adding a new conveyor belt over the pulleys on the cleared transverse side from said cleared transverse side.

16. A conveyor system for influencing spacing between successive objects during transport thereof in a direction of transport between a charge end and a discharge end, comprising:
    a plurality of end-to-end conveying modules, wherein each of the conveying modules includes a frame and at least one endless conveyor belt passed over pulleys at a front side and a rear side of the conveying module, wherein the pulleys are rotatable with respect to the frame, and drive means including a motor for driving the conveyor belt of the module;
    a main frame to which the conveying modules are connected;
    control means for individually controlling the drive means of each of the conveying modules,
    wherein said at least one conveyor belt is provided with inwardly extending grooves and at least one of said pulleys is circumferentially provided with ribs that fall into said grooves, or at least one of said pulleys is circumferentially provided with grooves and said at least one conveyor belt is provided with inwardly extending ribs that fall into said grooves.

17. A conveyor system according to claim 16, wherein said grooves and said ribs extend perpendicularly to the direction of transport.

18. A conveyor system according to claim 16, further comprising:
- a guide unit to guide the conveying modules positioned between at least two other of the conveying modules in a horizontal direction transverse to the direction of transport,
- wherein the guide unit includes guides mounted to each of the conveying modules for guiding an adjacent conveying module.

19. A conveyor system according to claim 16, wherein a most downstream or a most upstream conveying module is pivotable about a horizontal pivot axis that extends transversely to the direction of transport.

20. A conveyor system according to claim 19, wherein the most downstream or the most upstream conveying module engages an adjacent conveying module upon pivoting.

21. A conveyor system according to claim 16, wherein the conveying modules have a substantially triangular shape in a side view.

22. A conveyor system for transferring objects during transport thereof in a direction of transport between a supply conveyor and a discharge conveyor, which conveyors extend at an angle ranging between 0° and 90° relative to each other, comprising:

a conveying module including a frame, a plurality of parallel endless conveyor belts which are passed over pulleys provided at ends of the conveying module, wherein the pulleys are rotatable with respect to the frame, wherein individual pulleys are provided for each of the conveyor belts at various longitudinal positions of the conveying module, at least at a discharge end, and drive means for driving the plurality of conveyor belts, wherein a tensioning roller is provided for each of the conveyor belts, wherein the tensioning rollers abut against respective associated conveyor belts over part of a circumference of the tensioning rollers, wherein said tensioning rollers can pivot about a pivot axis with respect to a tensioning frame that is kept under tension with respect to the frame, and wherein the tensioning rollers are a springy type so that at least the part of the circumference of the tensioning rollers that abuts against the associated conveyor belts can spring inwards and outwards in a radial direction with respect to associated axes of rotation under an influence of a tensile force in the associated conveyor belts.

* * * * *